United States Patent [19]

Watanabe et al.

[11] Patent Number: 4,570,422

[45] Date of Patent: Feb. 18, 1986

[54] APPARATUS FOR BUNDLING ELONGATE ARTICLES

[75] Inventors: Kozo Watanabe; Masashi Kawada, both of Kurobe; Yozo Okada, Toyama, all of Japan

[73] Assignee: Yoshida Kogyo K.K., Tokyo, Japan

[21] Appl. No.: 639,481

[22] Filed: Aug. 10, 1984

[30] Foreign Application Priority Data

Feb. 25, 1984 [JP] Japan .................................. 59-34694

[51] Int. Cl.⁴ ........................ B65B 13/32; B65B 27.10
[52] U.S. Cl. ........................................ 53/557; 53/586; 53/590; 156/468; 156/497; 156/502; 156/513; 156/580.1; 100/33 PB
[58] Field of Search ....................... 156/277, 384, 73.1, 156/73.4, 580.1, 157, 85, 502, 212, 468, 497; 100/33 PB, 18; 53/399, 442, 444, 148, 582, 557, 586, 590

[56] References Cited

U.S. PATENT DOCUMENTS

| | | | |
|---|---|---|---|
| 3,704,566 | 12/1972 | Zimmermann | 53/586 X |
| 3,864,191 | 2/1975 | Tovarys | 156/212 X |
| 4,244,773 | 1/1981 | Siebeck et al. | 100/33 PB X |
| 4,250,692 | 2/1981 | Uchida | 100/33 PB X |
| 4,265,687 | 5/1981 | Mercer et al. | 100/33 PB X |
| 4,426,241 | 1/1984 | Zimmermann et al. | 156/468 X |

*Primary Examiner*—Michael Wityshyn
*Attorney, Agent, or Firm*—Hill, Van Santen, Steadman & Simpson

[57] ABSTRACT

A number of elongate articles such as slide fasteners are discharged from a discharging mechanism and placed on a length of a band web which has been supplied from a reel on a bundle tray by means of a feed mechanism. The length of the band web has a free end and an opposite end gripped by a gripper mechanism. End portions of the length of the band web are ultrasonically fused to each other by a fusing mechanism constituted by an ultrasonic horn and an anvil. The opposite end of the length as it is gripped by the gripper mechanism is cut off by a cutter mechanism to form a band bundling the elongate articles, which are then discharged by the bundle tray.

14 Claims, 15 Drawing Figures

APPARATUS FOR BUNDLING ELONGATE ARTICLES

BACKGROUND OF THE INVENTION

1. Field of the Invention:

The present invention relates to an apparatus for automatically bundling elongate articles such as slide fasteners, and more particularly to an apparatus for bundling a plurality of elongate articles with a bundling band fed to and cut off in a bundling station.

2. Description of the Prior Art:

Finished slide fasteners discharged one by one from a slide fastener finishing machine are generally bundled manually by bands, and a number of bundles are packaged in a box. The conventional bundling bands are marked with printed items of information such as slide fastener types, dimensions, colors, and the number of slide fasteners bundled together. Therefore, there have been required many kinds of bundling bands, and it has been quite a complex task to keep an inventory of all necessary types of bundling bands at all times. The bundling bands have to be changed each time slide fasteners of different kinds, dimensions, and numbers are to be manufactured. The prior bundling practice has also been disadvantageous in that if the bundling bands were not changed or different bands were used, the information printed on the bands would fail to properly indicate the slide fasteners tied up thereby. Furthermore, the manual bundling operation is time-consuming and makes the bundles unsightly as the bands tend to be irregularly positioned.

SUMMARY OF THE INVENTION

It is an object of the present invention to provide an apparatus for bundling elongate articles such as slide fasteners successively, automatically, and uniformly.

According to the present invention, a number of elongate articles such as slide fasteners are discharged from a discharging mechanism and placed on a length of a band web supplied from a reel on a bundle tray by means of a feed mechanism. The length of the band web has a free end and an opposite end gripped by a gripper mechanism. End portions of the length of the band web are ultrasonically fused to each other by a fusing mechanism which is constituted by an ultrasonic horn and an anvil. The opposite end of the length as it is gripped by the gripper mechanism is cut off by a cutter mechanism to form a band bundling the elongate articles, which are then discharged by the bundle tray.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION

Figure 1:
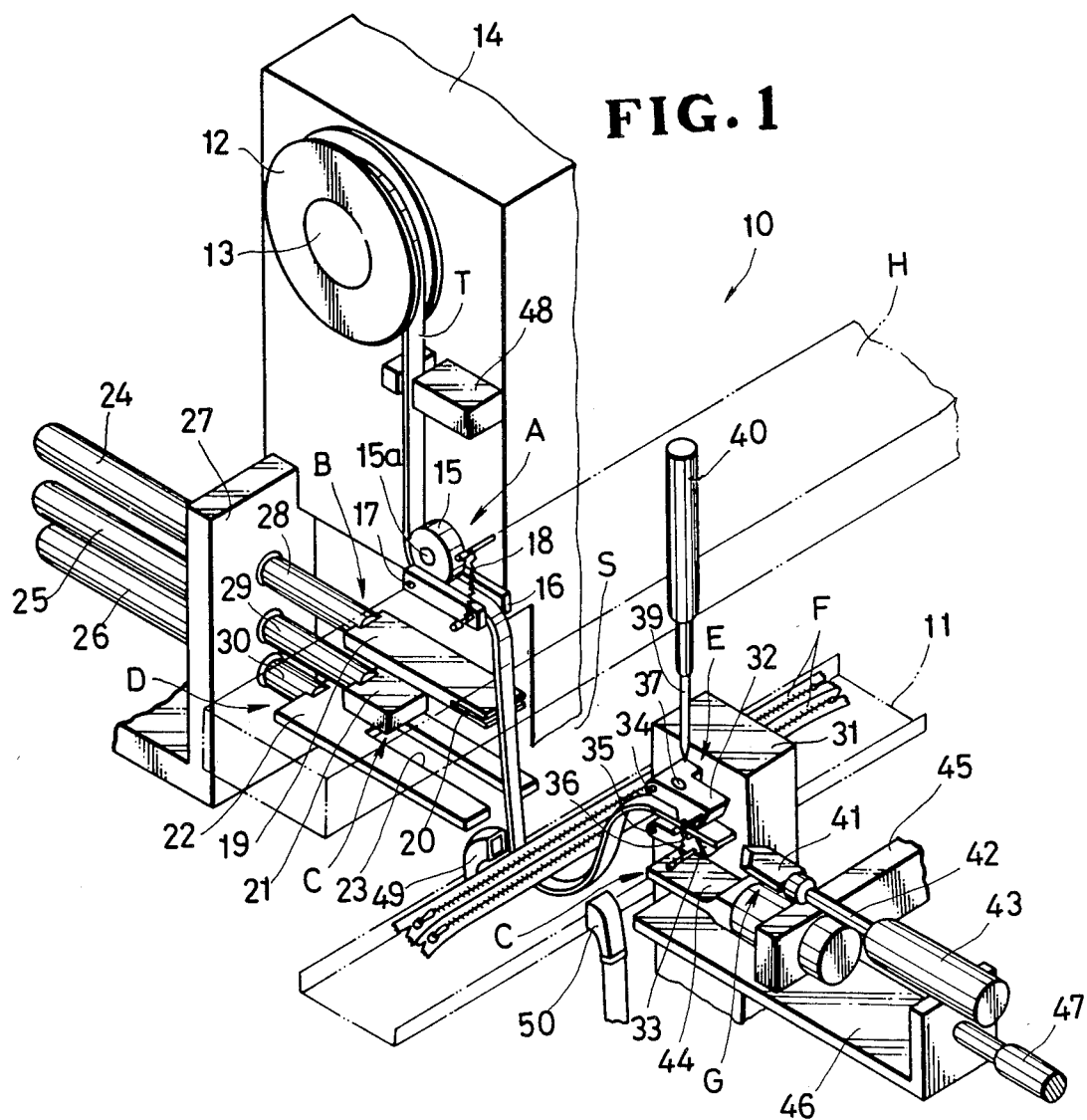
FIG. 1 is a perspective view of an apparatus for bundling slide fasteners according to the present invention.

FIG. 1 shows an apparatus for bundling a number of elongate pieces or articles F such as slide fasteners with a bundling band t (FIGS. 3A through 3D) of synthetic resin such as polyethylene or vinyl chloride, or laminated plastic of paper and synthetic resin, the apparatus being generally designated by the reference numeral 10.

The apparatus 10 has an elongate channel-shaped bundle tray 11 positioned substantially centrally in the apparatus 10 for receiving a bundle of elongate articles F. The bundle tray 11 is tiltable downwardly about one of its longitudinal edges to discharge the articles F bundled by the band t. A fastener discharger H coupled to a slide fastener finishing machine (not shown) is positioned over the bundle tray 11 for discharging finished slide fasteners F toward the bundle tray 11. The bundle tray 11 and the slide fastener discharger H are vertically spaced from each other with a bundling station S defined therebetween.

A reel 12 is rotatably mounted by a shaft 13 on a base 14 and positioned upwardly of the bundle tray 11 on one side thereof, the reel 12 supporting a roll of continuous band web T from which successive bands are cut off. A band web feed mechanism A is mounted on the base 14 and positioned substantially directly below the reel 12. The mechanism A includes a feed roller 15 rotatably mounted by a shaft 15a on the base 14 for feeding the continuous band web T by a predetermined length in each cycle of operation of the bundling apparatus 10, the shaft 15a being coupled to a reversible motor (not shown). The band web feed mechanism A further includes a band web guide 16 vertically angularly movably mounted by a pin 17 on the base 14 below the feed roller 15. The band web guide 16 has a guide groove defined in an upper surface thereof and receiving a lower portion of the feed roller 15 loosely fitted therein. The guide groove is slightly wider than the band web T for guiding the same therein. The band web guide 16 is normally biased by a spring 18 to move toward the feed roller 15 for coacting therewith in supplying the band web T by a controlled length each time.

A band web presser mechanism B is disposed below the feed roller 15 for laterally displacing the band web T as supplied from the feed roller 15. The band web presser mechanism B comprises a horizontal presser arm 19 having a horizontal slit 20 defined in a distal end thereof. An anvil 21 is positioned below the presser arm 19 and extends parallel to the presser arm 19, the anvil 21 constituting one part of a band fusing mechanism C. A band web holder mechanism D comprises a horizontal forked band web holder 22 disposed below and extending parallel to the presser arm 19. The band web holder 22 has a rectangular slot 23 defined therein and extending from a distal and thereof toward a proximal end but terminating short thereof. There are three parallel air cylinders 24, 25, 26 supported on a vertical base 27 and having respective piston rods 28, 29, 30 connected respectively to the presser arm 19, the anvil 21, and the band web holder 22 for retractably moving them toward the bundling station S.

Figure 4:
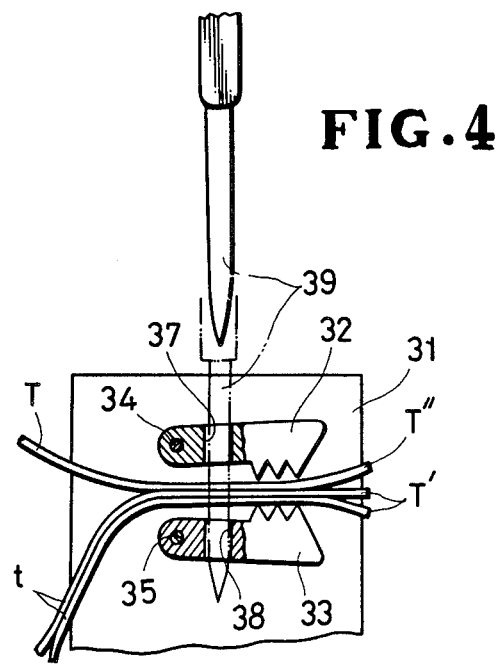
FIG. 4 is an enlarged side elevational view, partly broken away, showing the manner in which a piercing needle operates.

A band web gripper mechanism E is positioned upwardly of the bundle tray 11 on an opposite side thereof in confronting relation to the presser arm 19. The band web gripper mechanism E includes a base 31 and a pair of gripping jaws 32, 33 pivotably mounted on the base 31 by a pair of pins 34, 35, respectively. The gripping jaws 32, 33 are normally biased toward each other by a spring 36 connected between the gripping jaws 32, 33 for gripping a free end of the band web T and a portion thereof that has been drawn by the band web presser arm 19, as will be described later. The gripping jaws 32, 33 have apertures 37, 38 (FIG. 4) extending vertically therethrough. A piercing needle 39 is located above the band web gripper mechanism E in vertical alignment with the apertures 37, 38. The piercing needle 39 is vertically movable by an air cylinder 40.

A cutter mechanism G is located behind the band web gripper mechanism E and comprises a horizontal cutter 41 mounted on a piston rod 42 of an air cylinder 43. The cutter 41 is retractably movable toward the band web gripper mechanism E and into the slit 20 in the presser arm 19 as it is positioned between the gripping jaws 32, 33, as will be described later.

An ultrasonic horn 44 which constitutes the other part of the band fusing mechanism C is positioned below the band web gripper mechanism E in confronting relation to the anvil 21 for fusing the band web T applied thereagainst by the anvil 21 which has moved toward the ultrasonic horn 44. The ultrasonic horn 44 is supported at a rear end thereof by a support arm 45. A horizontal bundle pusher 46 is horizontally movably supported at a rear end thereof on a piston rod 47 of an air cylinder (not shown). The horizontal bundle pusher 46 is retractably movable toward a position over the bundle tray 11.

A printer 48 is positioned between the reel 12 and the feed roller 15 for marking various pieces of information such as a slide fastener type and a lot number on the bundle web T at spaced intervals therealong.

A pair of hot air nozzles 49, 50 is disposed one on each side of the bundle tray 11 in mutually confronting relation for emitting hot air toward a finished bundle on the bundle tray 11. Where the bundle web T is made of a thermally shrinkable material, a bundle band will shrink around slide fasteners F upon application of hot air for stably and tightly bundling the slide fasteners F.

Operation of the apparatus 10 of the foregoing construction will be described with reference to FIGS. 2A through 2H.

Figure 2A:
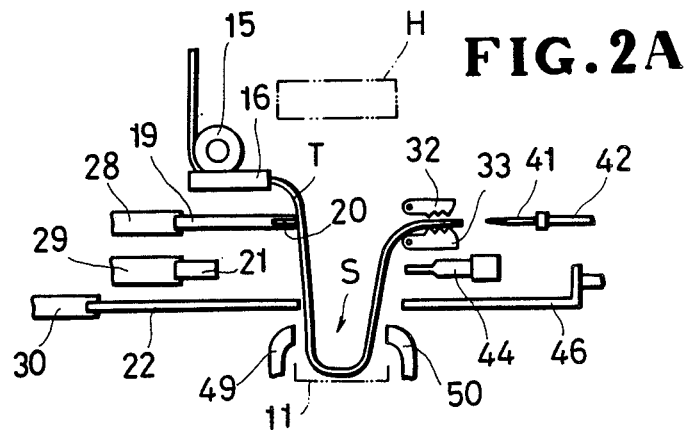
FIGS. 2A through 2H are schematic views showing progressive steps of bundling operation of the apparatus illustrated in FIG. 1.

As shown in FIG. 2A, a predetermined length of the band web T is unreeled by the feed roller 15 onto the bundle tray 11 substantially in the shape of a U with its free end gripped by the gripping jaws 32, 33. The presser arm 19, the anvil 21, the band web holder 22, and the bundle pusher 42 are in their retracted positions as shown.

Figure 2B:
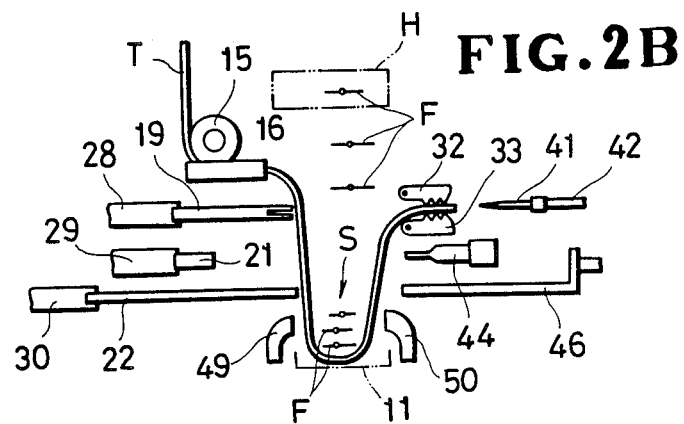

Finished slide fasteners F are discharged by gravity from the fastener discharger H and are placed on the band web T on the bundle tray 11, as illustrated in FIG. 2B.

Figure 2C:
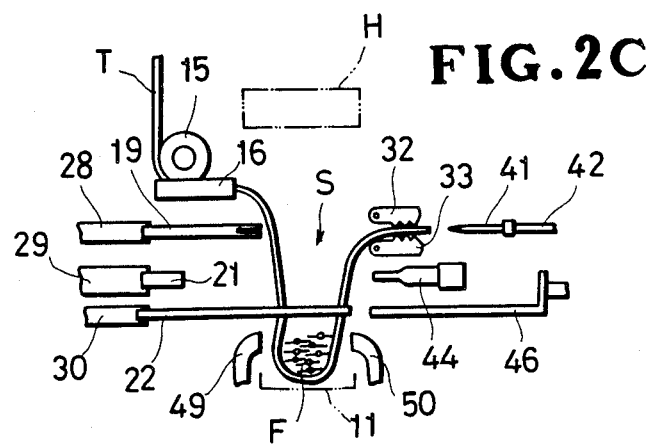

The band web holder 22 is moved forward with the band web T received in the slot 23 (FIG. 1) to a position over the bundle tray 11, in which the band web holder 22 holds down the slide fasteners F extending across the band web T, as shown in FIG. 2C.

Figure 2D:
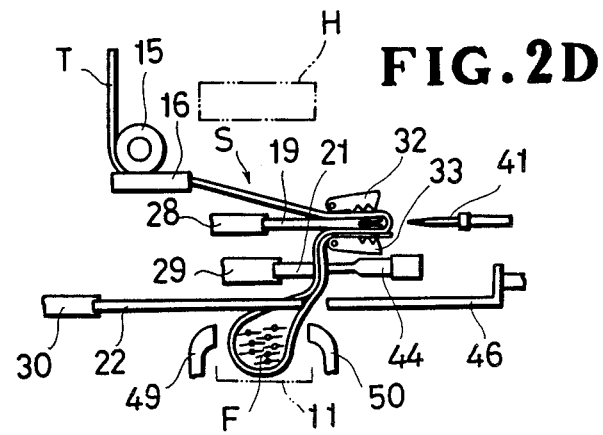

Then, the presser arm 19 and the anvil 21 are moved forward. The presser arm 19 presses the band web T as folded forcibly between the gripping jaws 32, 33. At this time, the band web T is prevented by the band web holder 22 from being excessively pulled upwardly. The anvil 21 also presses portions of the band web T as it surrounds the slide fasteners F against the tip end of the ultrasonic horn 44. The ultsonic horn 44 is now energized to fuse the band web T against the anvil 21 (FIG. 2D).

Figure 2E:
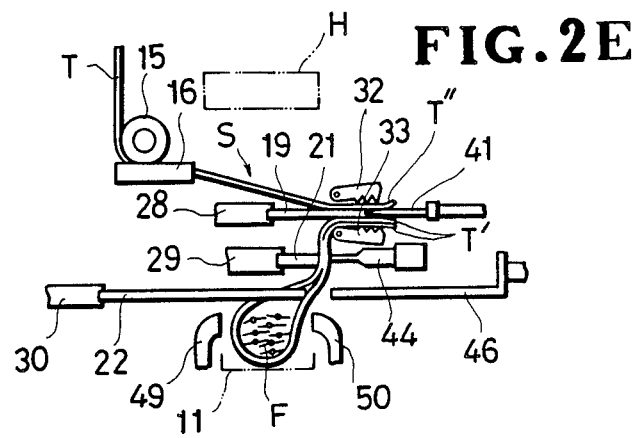

After the band web T has been ultrasonically fused, the horizontal cutter 41 is moved into the slit 20 in the presser arm 19, cutting into the folded portion of the band web T, as illustrated in FIG. 2E. The horizontal cutter 67 is more advantageous than a vertical cutter (not shown) in that there is no waste band web portion cut off.

Figure 2F:
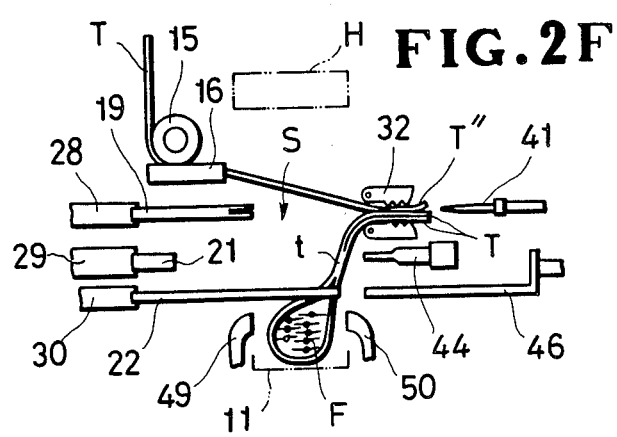
Figure 2G:
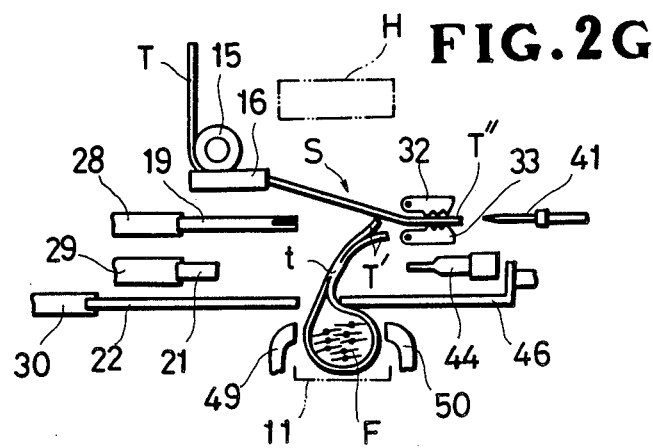

The presser arm 19, the anvil 21 and the cutter 41 are retracted to their original position, as shown in FIG. 2F. As shown in FIGS. 2E, 2F and 2G, the gripping jaws 32, 33 now grip an end T" of the band web T as supplied from the feed roller 15 and ends T' of bundling band t that has been cut off from the band web T.

Then the band web holder 22 is retracted and at the same time the bundle pusher 46 is moved foward to push the bundling band t so that its end will be pulled off the gripping jaws 32, 33. At this time, an end of the band web T as supplied from the feed roller 15 remains gripped by the gripping jaws 32, 33. In case the band web T is made of a thermally shrinkable material, hot air is discharged from the hot air nozzles 49, 50 against the bundling band t to cause the latter to shrink tightly around the slide fasteners F, thereby producing a bundled article p, as illustrated in FIG. 2H.

Figure 2H:
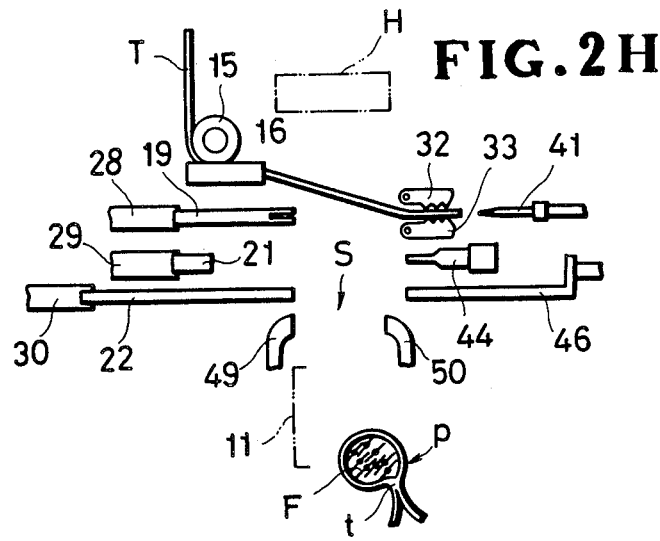

Finally the bundle tray 11 is tilted about one of its longitudinal edges to discharge the bundled article p as shown in FIG. 2H.

One cycle of bundling operation is now completed. The above cycle is then repeated to produce successive bundles of slide fasteners F. The printer 48 is actuated to mark the band web T with necessary information in each bundling cycle.

Figure 3A:
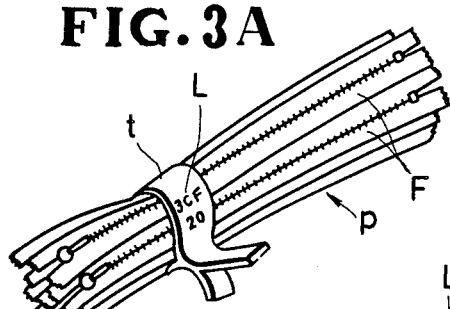
FIGS. 3A through 3D are perspective views of slide fasteners bundled by the apparatus of FIG. 1.
Figure 3B:
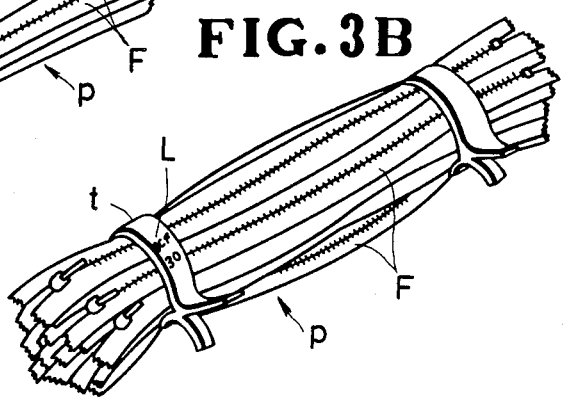
Figure 3C:
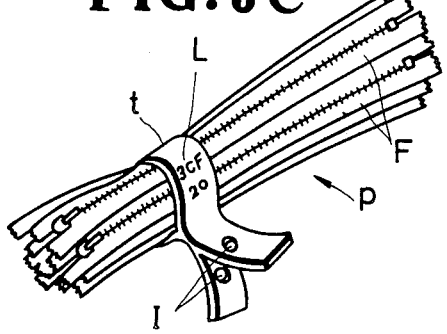

FIG. 3A shows a bundled article p thus produced from the apparatus 10. The bundled slide fasteners F are bundled by the band t bearing a printed piece of information L indicating a lot number. FIG. 3B illustrates another bundled article p in which the slide fasteners F are bundled by two bands t which can be supplied by two of the apparatus 10 which are disposed side by side.

Figure 3D:
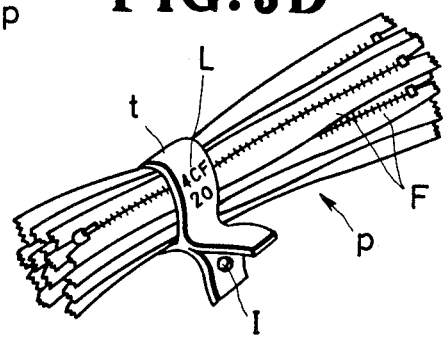

The piercing needle 39 is actuated by the air cylinder 40 at the time one sequence of bunding cycles is completed, or upon a shortage of slide fasteners F to be bundled together at the time a different number of slide fasteners are to be tied by one band or a different type of slide fasteners is to be bundled. More specifically, when there is a shortage of slide fasteners F to be bundled together by one band, the piercing needle 39 is lowered all the way through the apertures 37, 38 in the gripping jaws 32, 33 to form holes I (FIG. 3C) in the ends T' of the band t, thus indicating such a slide fastener shortage. After the piercing needle 39 has been lifted and the bundled arcticle p has been discharged, the pierced end T" of the band web T remains gripped between the gripping jaws 32, 33. Since the piercing needle 39 is not actuated if there is a sufficient number of slide fasteners supplied, a next bundled article p has a band t having only one hole I in one of the ends thereof, as shown in FIG. 3D. Therefore, the band t with one pierced hole only can be distinguished from the band which bundles an insufficient number of slide fasteners. The piercing needle 39 is, preferably put into operation in the step shown in FIG. 2F.

The band web feed mechanism A, the band web presser mechanism B, the fusing mechanism C, the band web holder mechanism D, and the cutter mechanism G are driven by different drive sources so that the mechanisms can be adjusted separately to achieve a desired operation sequence. Therefore, band webs and slide fasteners of different types and dimensions can be used on the apparatus 10.

Figure 5:
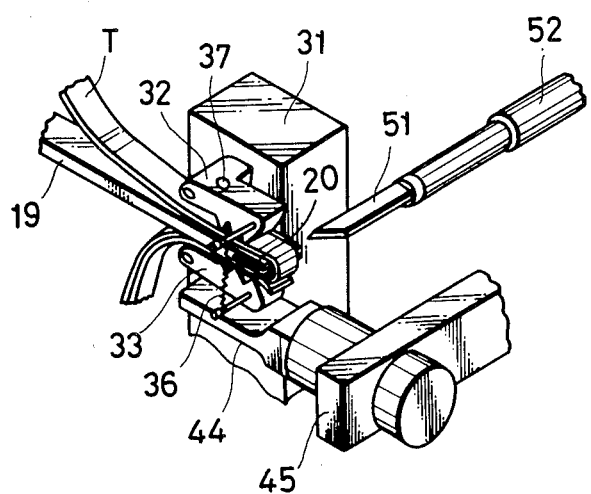
FIG. 5 is a fragmentary perspective view of a cutter according to a modification.

FIG. 5 shows a cutter mechanism according to a modified form of the invention. The cutter mechanism includes a cutter 51 drivable by an air cylinder 52 to move in a direction substantially perpendicularly to the direction in which the presser arm 19 is retractably movable. The cutter 51 transversely cuts through the folded band web portion projecting from the gripping jaws 32, 33. The cutter mechanism of FIG. 5 also does not produce any waste band web.

Although various minor modifications may be suggested by those versed in the art, it should be understood that we wish to embody within the scope of the patent warranted hereon, all such embodiments as reasonably and properly come within the scope of our contribution to the art.

What is claimed is:

1. An apparatus for bundling a number of elongate articles with a band, comprising:
   (a) a bundle tray;
   (b) a reel for the band web;
   (c) a feed mechanism for supplying a length of the band web from said reel onto said bundle tray;
   (d) a discharger for discharging a number of elongate articles onto said length on said bundle tray;
   (e) a gripper mechanism disposed on one side of said bundle tray for gripping a free end of said length;
   (f) a presser mechanism disposed on an opposite side of said bundle tray for pressing an opposite end of said length so as to be gripped by said gripper mechanism with said length surrounding said elongate articles;
   (g) a fusing mechanism for fusing end portions of said length to each other;
   (h) a holder mechanism for holding said elongate articles when said opposite end of said length is gripped by said gripper mechanism; and
   (i) a cutter mechanism for cutting said length off said band web at said opposite end of said length as it is gripped by said gripper mechanism, thereby producing a band bundling said elongate articles.

2. An apparatus according to claim 1, including a base, said feed mechanism comprising a motor-driven roller rotatably mounted on said base, a guide pivotably mounted on said base and having a guide groove for guiding said band web therein, and a spring for normally urging said guide toward said roller.

3. An appartus according to claim 1, said gripper mechanism comprising a pair of gripping jaws for gripping said free end of the band web therebetween, and said presser mechanism comprising a presser arm, said gripping jaws and said presser arm being relatively movable toward each other to enable said presser arm to be received between said gripping jaws, thereby inserting said opposite ends of said band web therebetween.

4. An apparatus according to claim 3, said presser arm being retractably movable between said gripping jaws.

5. An apparatus according to claim 3, said presser arm having a slit defined in a distal end thereof, said cutter mechanism including a cutter reciprocably movable into said slit when said presser arm is received between said gripping jaws.

6. An apparatus according to claim 1, said fusing mechanism comprising an ultrasonic horn and an anvil disposed respectively below said gripper mechanism and said presser mechanism and relatively movable toward and away from each other to press said end portions of said length therebetween.

7. An apparatus according to claim 6, said ultrasonic horn being fixed, said anvil being movable toward and away from said ultrasonic horn to press said end portions of said length against said ultrasonic horn.

8. An apparatus according to claim 1, said holder mechanism comprising a holder having a slot for receiving said length of the band web therein and movable over said elongate articles on said bundle tray.

9. An apparatus according to claim 1, said cutter mechanism comprising a horizontal cutter for longitudinally cutting off said opposite end of said length from the web as it projects from said gripper mechanism.

10. An apparatus according to claim 1, further including a pusher for pushing said band off said gripper mechanism.

11. An apparatus according to claim 1, further including means for thermally shrinking the band tighly around said elongate articles.

12. An apparatus according to claim 11, said means comprising a pair of hot air nozzles disposed one on each side of said bundle tray for applying hot air against the band.

13. An apparatus according to claim 1, further including means for selectively piercing said free end and said opposite end.

14. An apparatus according to claim 13, said gripper mechanism comprising a pair of gripping jaws for gripping said free end and said opposite end of the band web therebetween, said gripping jaws having a pair of apertures respectively therein, said means comprising a piercing needle movable through said apertures for piercing said free and and said opposite end.

* * * * *